United States Patent [19]

Isshiki

[11] 4,383,284

[45] May 10, 1983

[54] PERPENDICULAR MAGNETIC HEAD AND METHOD OF MANUFACTURING THE SAME

[75] Inventor: Masanori Isshiki, Yokohama, Japan

[73] Assignee: Tokyo Shibaura Denki Kabushiki Kaisha, Kawasaki, Japan

[21] Appl. No.: 204,051

[22] Filed: Nov. 4, 1980

[30] Foreign Application Priority Data

Dec. 14, 1979 [JP] Japan .................................. 54-162605
Dec. 14, 1979 [JP] Japan .................................. 54-162607
Dec. 14, 1979 [JP] Japan .................................. 54-162609

[51] Int. Cl.³ .......................... G11B 5/12; G11B 5/20; G11B 5/22
[52] U.S. Cl. .................................... 360/125; 360/122; 360/123; 360/126
[58] Field of Search ................................ 360/125–127, 360/119, 120, 128, 122, 123

[56] References Cited

U.S. PATENT DOCUMENTS 4,210,946 7/1980 Iwasaki et al. ..................... 360/131
4,251,842 2/1981 Iwasaki et al. ..................... 360/119

FOREIGN PATENT DOCUMENTS 55-84015 6/1980 Japan ................................. 360/119

Primary Examiner—Alfred H. Eddleman
Attorney, Agent, or Firm—Oblon, Fisher, Spivak, McClelland & Maier

[57] ABSTRACT

A perpendicular magnetic recording head is disclosed which includes a block core of a high magnetic permeability material having a side surface substantially perpendicular to a magnetic surface of a magnetic tape moving relative to it, a thin film core including a magnetic thin film of a high magnetic permeability material, the thin film core being secured to the side surface of the block core and having a width smaller than the width of the block core, the thin film core having a pole section extending from said side surface of the block core substantially perpendicularly to the magnetic surface and in contact therewith at the end, and an exciting coil wound on the block core and thin film core.

12 Claims, 18 Drawing Figures

(a) (b) (c)
(d) (e) (f)

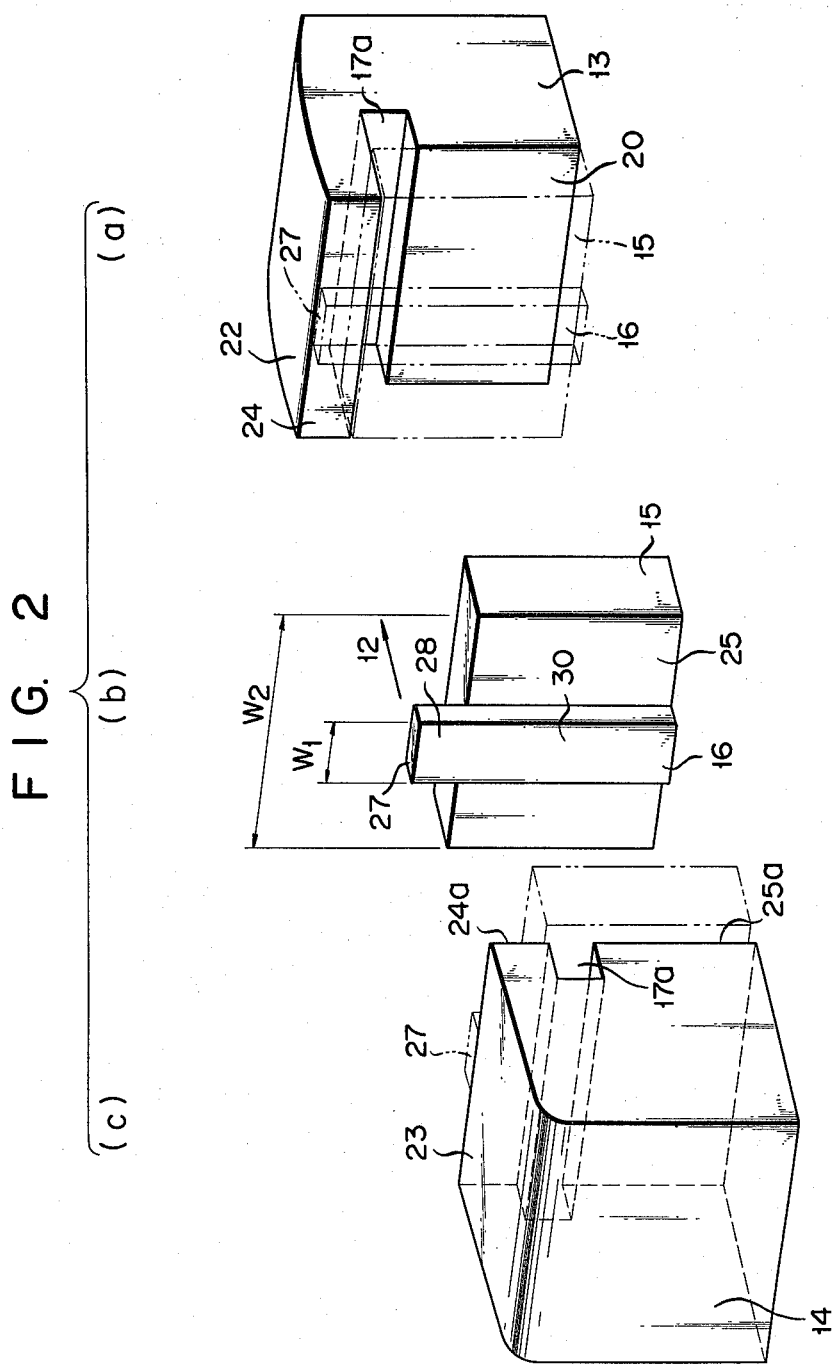

PERPENDICULAR MAGNETIC HEAD AND METHOD OF MANUFACTURING THE SAME

BACKGROUND OF THE INVENTION

1. Field of the Invention

This invention relates to a perpendicular magnetic head, which magnetizes the magnetic layer of a magnetic recording medium moving relative to it in the direction of the thickness thereof, and a method of manufacturing the same. 2. Description of the Prior Art The conceptional construction of the magnetic head of this kind has already been known, and it comprises a block core, a thin film core secured thereto and an exciting coil wound on both these cores. The thin film core includes a magnetic thin film of a high magnetic permeability material or a magnetic soft material such as Permalloy (Trade Name), and its tip portion extending toward the magnetic surface of the magnetic recording medium constitutes a magnetic pole section with the end thereof constituting a pole face which is in frictional contact with the afore-mentioned magnetic surface. The block core serves to support the thin film core and also has an effect of preventing the magnetic saturation of the thin film core. With this magnetic head almost all the magnetic flux produced in the block-like core or block core and thin film core is led through the afore-mentioned pole section which constitutes a magnetic path of a narrow sectional area to the magnetic surface of the medium at a high flux density. Thus, the magnetic layer of the magnetic recording medium is magnetized in the direction of its thickness over it very narrow area by the highly intense magnetic field acting in that direction. This magnetic head thus permits recording of an electric signal supplied to the exciting coil on the recording medium with high efficiency and at a high density. Although this magnetic head has various merits over the prior-art ring type magnetic head, in addition to these merits it has been desired to increase the efficiency and extend the service life of the head for practical use. These demands are particularly high in case where it is intended to employ the perpendicular magnetic head in the video tape recorder (VTR), for which rapid technical advancement is now being achieved. This is so because the VTR is required to record video signal at high sensitivity and high density as well as being small in size and having long service life.

Hitherto, however, the construction of the perpendicular magnetic head has been known only conceptionally, and no magnetic head of this type has been provided for practical use. Also, there has been known neither a concrete construction or a concrete method of manufacture for achieving improved performance and extended service life of this kind of magnetic heads.

SUMMARY OF THE INVENTION

The primary object of this invention is to provide a perpendicular magnetic recording head which permits recording of a supplied electric signal with high efficiency and at a high density as well as being small in size and having an extended service life.

To achieve the above objective, the perpendicular magnetic head according to the invention comprises a block core of a high magnetic permeability material, a thin film core of a high magnetic permeability material such as Permalloy, the thin film core being secured to the block core and having a magnetic pole section extending toward the magnetic surface of a magnetic recording medium and having a smaller width than the block core, and an exciting coil wound on both the block core and the thin film core.

With the pole section having a smaller width than the block core the magnetic flux produced in the block core can be effectively concentrated in the narrow thin film core and coupled to the magnetic tape, so that a strong magnetic field is provided in the magnetic layer. Thus, it is possible to obtain magnetic recording in the magnetic layer with high efficiency and at a high density. With a magnetic head construction where the width of the thin film is equal to or greater than the width of the block core, the magnetic field led to the magnetic surface of the recording medium is concentrated in a central portion of the pole section, so that uniform magnetic recording in the direction of the track width cannot be obtained. Also, in this case the actual track width is reduced to reduce the reproduced output. In contrast, with the construction according to the invention, in which the width of the block core is greater than that of the pole section of the thin film core, the magnetic field is uniformly led out from the pole section, so that it is possible to obtain uniform magnetic recording in the direction of the track width and hence a high output of reproduction.

In one embodiment of the invention, first and second support members are provided to support the pole section constituted by the thin film core between them. As will be described hereinafter in connection with an embodiment of the invention, these support members and both the cores are strongly coupled together to produce an integral structure. Since the first and second support members have substantially the same width as the block core, that is, have a greater width than the thin film core, they can be directly and strongly coupled together in their portions other than those coupled to the thin film core, so that a very rigid magnetic head construction can be obtained. In addition, since the magnetic pole section is rigidly sandwiched between the opposite side support members, it can withstand long use without wear or deformation of its pole face. Particularly, since the edge of the pole face on the side thereof, from which the magnetic tape departs, is in close contact with the corresponding support member, this edge can be maintained sharp to permit recording of signals on the tape with a high resolution.

BRIEF DESCRIPTION OF THE DRAWINGS

FIGS. 2a, 2b and 2c are exploded perspective views showing component parts of the magnetic head shown in FIG. 1;

DETAILED DESCRIPTION OF THE PREFERRED EMBODIMENT

Now, the magnetic head and the method of manufacture of the same according to the invention will be described in conjunction with some preferred embodiments thereof.

Figure 1:
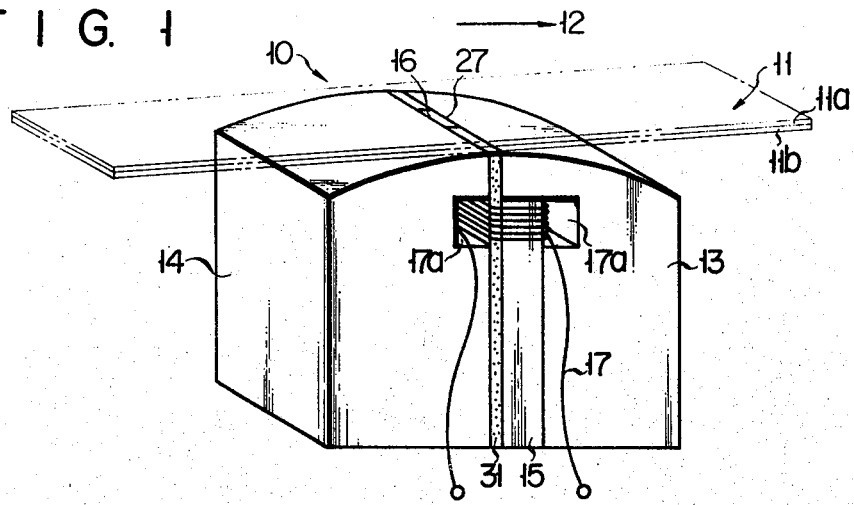
FIG. 1 is a perspective view showing an embodiment of the perpendicular magnetic head according to the invention.

FIG. 1 shows a magnetic head according to the invention, and FIGS. 2a to 2c show respective three parts of the magnetic head of FIG. 1 except for an exciting coil 17. This embodiment of the magnetic head, generally designated at 10, cooperates with a magnetic recording medium or a magnetic tape 11 as shown in FIG. 1 by imaginary lines. The magnetic tape 11 includes a base 11a and a recording layer or magnetic layer 11b which is formed on one side of the base 11a by applying a powdery magnetic material thereto or forming a magnetic thin film by means of spattering or deposition, and it is moved toward the right in FIG. 1 as shown by an arrow 12. The magnetic head 10 comprises first and second support members 13 and 14 of a non-magnetic material such as glass or a ceramic material, a 15 block core 15 of a magnetic soft material such as Permalloy, Sendust, Mn-Zn ferrite and amorphous alloys, a rectangular thin film core 16 including a magnetic thin film of the afore-mentioned magnetic soft material, and an exciting coil 17 wound on the block core 15 and thin film core 16 through coil grooves 17a formed in the support members 13 and 14. These component parts are made integral with one another.

The first support member 13 is formed with a rectangular recess 20, in which the rectangular block core 15 is accommodated and bonded to the member 13. The first and second support members 13 and 14 are provided on their side in frictional contact with the magnetic tape 11 respectively with first and second arcuate guide surfaces 22 and 23. The first support member 13 has a pole section clamp surface 24 (FIG. 2a) formed on the side to which the magnetic tape approaches. This surface 24 is substantially perpendicular to the direction of arrow 12, and it extends from the first guide surface 22 and terminates in a surface defining the recess 20. It is flush with a side surface 25 (FIGS. 2a and 2b) of the block core 15 received in the recess 20. The thin film core 16 is formed on and secured to the clamp surface 24 and side surface 25 by vacuum deposition, spattering or electrodeposition, and at its end it has a pole face 27 in frictional contact with the magnetic layer 11b of the magnetic tape 11. The shapes of the cores 15 and 16 and their positional relation are clearly shown in FIGS. 2a and 2b. Imaginary lines shown in FIG. 2a show the positional relation of the cores 15 and 16 to the first support member 13 when the former is coupled to the latter. It will be seen from FIGS. 2a and 2b that the pole section clamp surface 24 and the side surface 25 are flush with each other and that the magnetic tape approach side surface of a magnetic pole section of the thin film core 16 extending from the surface 25 of the block core 15 toward the magnetic tape (now shown) is in close contact with the clamp surface 24. It will also be seen from FIG. 2b a lower portion of the thin film core 16 adjacent to the pole section 28, i.e., a core section 30, is secured to the side surface 25 and that the width $W_1$ of the pole section 28 which determines the track width of the magnetic tape is smaller than the width dimension $W_2$ of the block core 15 in the same direction.

FIG. 2c shows the second support member 14. The figure also shows by imaginary lines the positional relation of the core 15 and 16 to the second support member 14 when the former are coupled to the latter. The support member 14 has a pole section clamp surface 24a and a side surface 25a on its side, from which the magnetic tape departs, the surface 24a being flush with the surface 25a and is also formed with a coil groove 17a between these surfaces.

The component shown apart in FIGS. 2a, 2b and 2c are integrally coupled together, and then the exciting coil 17 is wound on the cores to obtain the magnetic head 10 as shown in FIG. 1. The block core 15 and first support member 13 are secured to each other by glass adhesion or with an organic adhesive, while the securement of the thin film core 16 to the side surface 25 of the block core and also to the clamp surface 24 is obtained by means of vacuum deposition as mentioned earlier. The securement of the clamp surface 24a and side surface 25a of the second support member 14 to the tape approach side surface of the thin film core 16 and the side surface 25 of the block core 15 respectively is obtained by glass adhesion or bonding using an organic adhesive. By the afore-mentioned various securing means the pole section 28 of the thin film core 16 is firmly secured to and sandwiched between the pole section clamp surfaces 24 and 24a, and the pole face 27 and first and second guide surfaces 22 and 23 are all made flush by machining.

Figure 3:
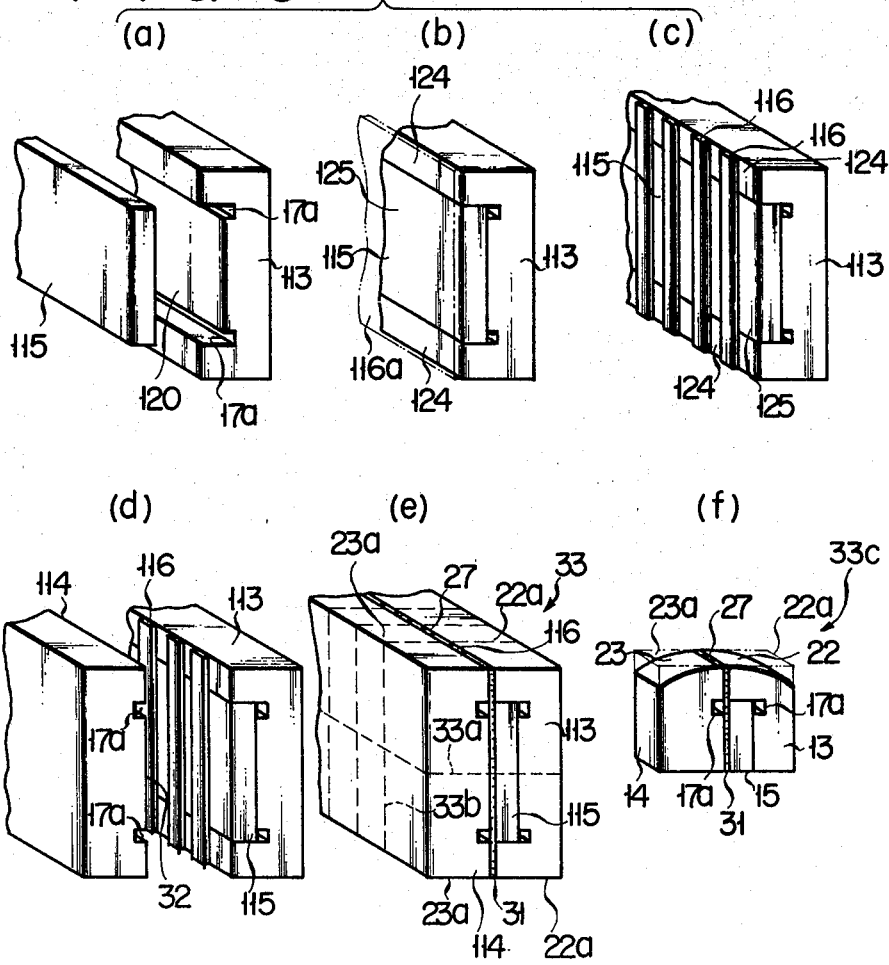
FIGS. 3a to 3f are views illustrating the steps of manufacture of the magnetic head shown in FIG. 1.

In FIGS. 1, 3e and 3f, reference numeral 31 designates the glass of the glass adhesion or the organic adhesive coupling together the block core 15 and second support member 14 and also coupling together the first and second support members 13 and 14.

With the magnetic head 10 according to the invention, magnetic flux produced in the block core 15 is supplied from the pole face 27 of a smaller width than the block core 15 to the magnetic layer 11b of the magnetic tape 11, so that it is possible to obtain recording of a signal in a narrow track on the magnetic layer 11b at a high density and with high performance. In addition, since the magnetic flux is concentrated uniformly over the width of the pole face 27, it is possible to obtain uniform recording in the direction of the track width and thus obtain a high output of reproduction. Further, since the pole section 28 is sandwiched between and flush with the opposite side support members 13 and 14, the elongate rectangular shape of the pole face 27 is hardly changed even after long use of head 10. Thus, it is possible for a long time to record a signal on the magnetic surface 27 with a very high resolution. The magnetic tape 11 is preferably moved with respect to the magnetic head 10 from the side of the second guide surface 23 to the side of the first guide surface 22. The reason for this is that in this case the side surface of the pole section 28 that is stably and reliably secured to the pole section clamp surface 24 is on the side of the pole face 27, from which the magnetic tape 11 departs, so that this secured side, i.e., the edge of the pole face 27 on the tape departure side, is hardly damaged even in case where the magnetic tape 11 proceeds in frictional contact with the pole section 28. In other words, in this case the tape departure side edge of the pole face, which is an important factor in determining the quality of the magnetized memory, is not changed for a long time, so that high resolution recording of the supplied signal with the magnetic head 10 can be obtained for a long time.

Further, it will be understood from the above explanation that since the first and second support members 13 and 14, block core 15 and thin film core 16 are integrally coupled together by the vacuum deposition or like and bonding processes, the magnetic head 10 is rigid as a whole and can have a sufficient mechanical strength to withstand use as, for instance, a rotary magnetic head. Particularly, with the construction according to the invention, in which the width of the thin film core 16 is smaller than that of the block-like core 15 and support members 13 and 14, the support members 13 and 14 can be directly and firmly coupled together by adhesion and this construction can promote the rigidity of the head 10.

It is to be appreciated from the above that the magnetic head 10 according to the invention permits magnetic recording with high sensitivity and high resolution and at a high density as well as being small in weight and having long life.

Now, an embodiment of the method of manufacturing the magnetic head 10 shown in FIG. 1 will be described with reference to FIGS. 3a to 3f. This method of manufacture is suited for manufacturing the magnetic head 10 on a mass production scale and comprises the following steps.

In a first step, as shown in FIG. 3a, a first support member block 113 of a non-magnetic material, which is formed with a shallow groove 120 open on the left hand side in the Figure and also with two deep groove 17a extending along the opposite edges of the groove 120, and a core block 115 of a magnetic soft material are prepared.

In a second step, the core block 115 is fitted in the shallow groove 120 in the first support member block 113 and secured thereto, as shown in FIG. 3b. At this time, the securement is effected by glass adhesion or bonding using an organic adhesive. Subsequently, the left side surface of the first support member block 113 and the left side exposed surfaces of the core block 115 are made flat and flush with one another by means of polishing.

In a third step, the surfaces 124 and 125 which are flush with each other are entirely covered with a ground film, for instance of Ti, and then a thin film of a magnetic soft material is formed on the ground film by vacuum deposition, spattering or electrodeposition (the thin film being shown by imaginary lines and designated at 116a in FIG. 3b). This thin film is selectively chemically etched to leave a plurality of thin film strips 116 vertically extending and appropriately spaced apart, as shown in FIG. 3c.

In a fourth step, a second support member block 114, as shown in FIG. 3d, having a surface 32 facing the first support member block 113 and formed with two coil grooves 17a is secured to the thin film strip 116, the surface 124 of the block 113 and the surface 125 of the core block 115. The securement at this time is effected by glass adhesion or bonding using an organic adhesive.

In a fifth step, as shown in FIG. 3e, the semiproduct block obtained in the preceding step, designated at 33, is cut into two pieces along a horizontal plane shown by broken lines 33a and also cut along a plurality of vertical planes shown by broken lines 33b, thus obtaining a number of separated blocks or semiproduct heads 33c. One of these eventual magnetic heads 33c is shown in FIG. 3f. In FIG. 3f, however, its top is shown by imaginary lines since the top is subsequently processed.

In a sixth step, as shown in FIG. 3f, the top of the semiproduct head, designated at 33c, including the tops 22a and 23a of the members 13 and 14 and the top of the thin film core 16 is machined into an arcuate profile, which is constituted by the first and second guide surfaces 22 and 23 and the pole face 27 flush with these surfaces. The afore-mentioned thin film core 16 in FIG. 3f is obtained by cutting the thin film strip 116 formed in the step of FIG. 3c into two, upper and lower divisions, the first and second support members 13 and 14 are formed by cutting the respective first and second support member blocks shown in FIG. 3d into two, upper and lower divisions in the step of FIG. 3e, and the block core 15 is obtained by cutting the core block 115 shown in FIG. 3d into two, upper and lower divisions in the step of FIG. 3e.

In the last step, the exciting coil 17 is wound on the cores 15 and 16 through the coil grooves 17a in the support members 13 and 14, thus completing the manufacture of the perpendicular magnetic head as shown in FIG. 1.

It will be seen that in the above method of manufacture many corresponding parts of magnetic heads are commonly processed in the respective steps before the semiproduct block is divided into semiproduct heads, and this has the same effect as that the number of processing steps for the individual magnectic recording heads is reduced in effect in mass production. In addition, since the processing of small-size parts of magnetic heads can be collectively made on an adequate size, it is possible to improve the machining precision of various portions.

While the description so far has concerned with the first embodiment of the magnetic head according to the invention, various other embodiments will now be described.

Figure 4:
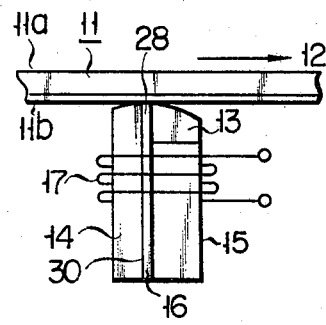
FIGS. 4 and 5 are elevational views respectively showing second and third embodiments of the invention.

FIG. 4 shows a second embodiment of the magnetic head. This embodiment is different from the first embodiment of FIG. 1 in that the first support member 13 is smaller and is bonded to the top of the block core 15 and that the exciting coil 17 is wound on the block core 16, thin film core 15 and second support member 14. The magnetic recording head of this construction can be made smaller in size than the head of FIG. 1. While in the head of FIG. 4 between the members clamping the core section of the thin film core 16 is found glass in case of the glass adhesion or an organic adhesive in case of the bonding, it is omitted to clearly show the construction of the magnetic head.

Figure 5:
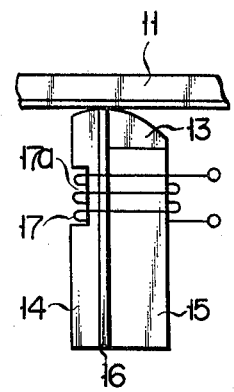

FIG. 5 shows a third embodiment. This embodiment is substantially the same as the preceding embodiment of FIG. 4 except for that the second support member 14 is formed on the outer side with a coil groove 17a. By the provision of this coil groove 17a the exciting coil 17 can be readily wound in a predetermined position.

Figure 6:
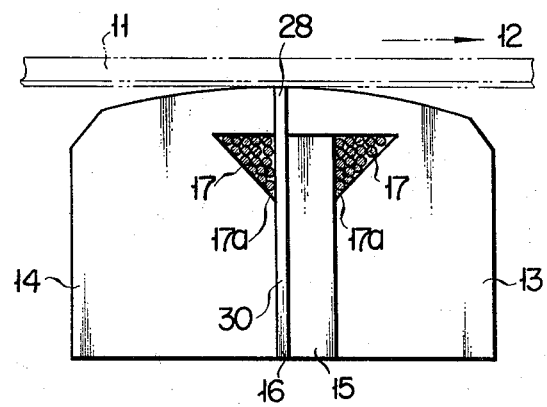
FIGS. 6 and 7 are elevational views respectively showing fourth and fifth embodiments of the invention.

FIG. 6 shows a fourth embodiment. This embodiment is different from the embodiment of FIG. 1 in the shape of the coil grooves 17a. More particularly, each of the coil grooves 17a has a sectional profile becoming wider toward the top. Thus, the turns number of the exciting coil 17 per unit length increases toward the top. This winding method has an effect that the magnetic flux produced in the cores 15 and 16 can be led to the pole section 28 with less leakage flux and with less exciting current compared to the winding method of the embodiment shown in FIG. 1. By the winding method in this embodiment, unlike the case of the embodiment of FIG. 1 where coil is wound substantially uniformly in the vertical direction, portions of the cores 15 and 16 in which the flux is saturated or almost saturated are found near the top of the block core 15, so that the flux produced can be led to the pole section 28 without considerable leakage. Thus, it is possible to improve the recording efficiency of the magnetic head.

Figure 7:
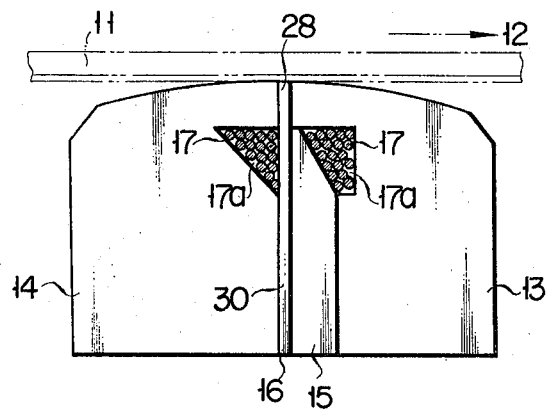

FIG. 7 shows a fifth embodiment. This embodiment is intended to obtain substantially the same effect as the preceding embodiment of FIG. 6. In this embodiment, the right side coil groove 17a has a substantially rectangular sectional profile, and the corresponding portion of the block core 15 has an inclined right side surface such that its thickness is reduced toward the top. With this configuration, the turns number of the exciting coil 17 per unit length is increased toward the top. Since in this embodiment the upper portion of the block core 15 becomes progressively thinner toward the pole section 28, the magnetic flux produced in the block core 15 can be smoothly led into the pole section 28.

Figure 8:
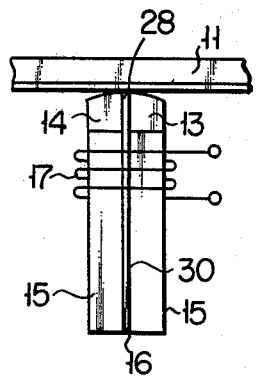
FIGS. 8 and 9 are elevational views respectively showing sixth and seventh embodiments of the invention.

FIG. 8 shows a sixth embodiment. In this embodiment, two block cores 15 are used, and the core section 30 of the thin film core 16 is sandwiched between these block cores. The pole section 28 of the thin film core 16 is sandwiched between the first and second support members 13 and 14, which are bonded to the magnetic tape side end, i.e., the top, of the respective block cores 15, and the exciting coil 17 is wound on both the block-like cores 15 and the core section 30 of the thin film core 16. With this construction of the magnetic recording head, in which two block cores 15 is used for a single thin film core 16, it is possible to introduce a greater magnetic flux to the pole section 28 with the same exciting current compared to the case of using a single block core 15. In other words, with this construction of the magnetic head the sensitivity is higher than that of the construction using a single block core 15.

Figure 9:
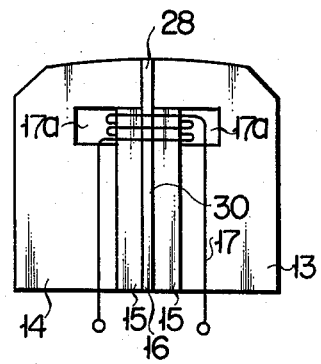

FIG. 9 shows a seventh embodiment. In this embodiment, like the preceding embodiment of FIG. 8, two block-like cores 15 are used. However, the cores 15 and 16 in this case are sandwiched between the first and second support members 13 and 14 of the same shape. The exciting coil 17 is wound on the block cores 15 and the core section 30 of the thin film core 16 through the coil grooves 17a formed in the support members 13 and 14. With this embodiment of the magnetic head in addition to be able to obtain a high sensitivity like the embodiment of FIG. 8, a rigid construction can be obtained since the cores 15 and 16 are firmly sandwiched between and integrally secured to the first and second support members.

Figure 10:
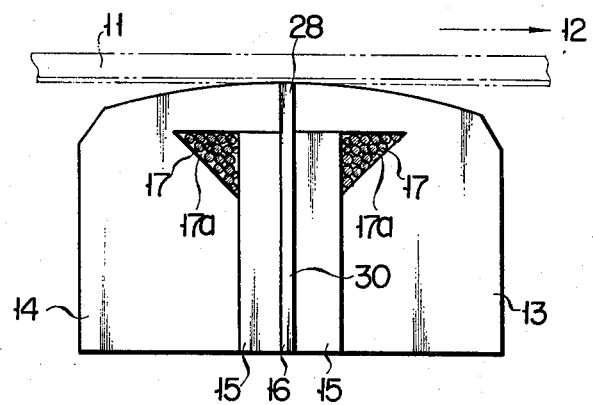
FIGS. 10 and 11 are elevational views respectively showing eighth and nineth embodiments of the invention.
Figure 11:
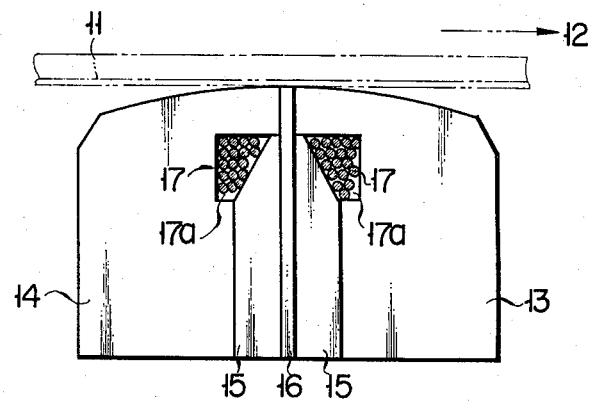

FIGS. 10 and 11 shows respective eighth and nineth embodiments. In these embodiments, the shape of the coil grooves in the magnetic head of FIG. 9 is modified to those shown in FIGS. 6 and 7 respectively. Thus, it is possible to obtain the same effects as obtainable with the constructions of FIGS. 6 and 7 in addition to the effects obtainable with the magnetic head of FIG. 9.

What is claimed is:

1. A perpendicular magnetic head capable of magnetizing a magnetic layer of a magnetic recording medium having said magnetic layer on one side and moved relative to said magnetic head, said magnetic layer being magnetized in the direction of the thickness thereof, said magnetic head comprising:

a block core of a high magnetic permeability material;

a thin film core mounted on said block core and having a pole section extending toward a magnetic surface of said magnetic recording medium, said pole section providing a width smaller in the direction of the track width of said magnetic recording medium than that of said block core and having at the end a pole face in contact with the magnetic surface of said magnetic recording medium, said thin film core including a thin film of a high magnetic permeability material; and an exciting coil wound on said thin film core and said block core, through said exciting coil current corresponding to an electric signal to be recorded on said magnetic recording medium being supplied, whereby a magnetic flux corresponding to said exciting current produced in said thin film core is coupled to said magnetic recording medium in the direction of the thickness thereof.

2. A perpendicular magnetic head according to claim 1, which further comprises first and second support members of a non-magnetic material and supporting side thin film core and said block core therebetween, said first support member having a recess, said block core being received in said recess and bonded to said first support member, said block core having an outer side surface with respect to side recess extending substantially perpendicular to said magnetic surface of said magnetic recording medium, said first support member having a pole section clamp surface flush with said side surface of said block core, said thin film core being secured to said pole section clamp surface and said side surface.

3. A perpendicular magnetic head according to claim 2, wherein said second support member has another pole section clamp surface and an another side surface, these surfaces being flush each other, said another side surface facing said side surface of said block core, said another pole section clamp surface facing said pole section clamp surface of said first support member, both said surfaces of said second support member being bonded to the corresponding surface to said thin film core, side pole section clamp surface of said first support member and to said side surface of said block core, whereby said first and second support members, said thin film core and said block core are integrally coupled together.

4. A perpendicular magnetic head according to claim 3, wherein said first and second support members have respective first and second top guide surfaces for guiding the movement of said magnetic recording medium, portions of said first and second top guide surfaces on the opposite sides of said pole section of said thin film core being flush with said pole face thereof.

5. A perpendicular magnetic head according to claim 3, wherein the number of turn of said exciting coil per unit length increases toward the end of said block core on the side of said magnetic recording medium.

6. A perpendicular magnetic head according to claim 5, wherein said exciting coil is wound through grooves formed in said respective first and second support members, the depth of said grooves being increased toward the afore-said end of said block core.

7. A perpendicular magnetic head according to claim 1, which further comprises another block core of a high magnetic permeability material having a width greater than that of said pole section of the thin film core, said thin film core being sandwiched between both said block cores, a magnetic flux being produced in said block cores and said thin film core by the action of said exciting coil and led to said pole section.

8. A perpendicular magnetic head according to claim 7, which further comprises first and second support members of a non-magnetic material, said thin film core being sandwiched between said first and second support members, said first support member having a recess, said block core being received in said recess, an outer side surface of said block core received in said recess extending substantially perpendicular to said magnetic surface of the magnetic recording medium, said first support member having a pole section clamp surface flush with said side surface of said block core, said thin film core being secured to said pole section and also to said side surface.

9. A perpendicular magnetic head according to claim 8, wherein said second support member has a recess, said another block core being received in said recess, an outer side surface of said another block core received in said recess extending substantially perpendicular to said magnetic surface of a magnetic recording medium, said second support member having another pole section clamp surface flush with said side surface of said another block core, said pole section clamp surface and said another pole section clamp surface and also said side surface and said another side surface being bonded to one another with said thin film core sandwiched therebetween, whereby said first and second support members, said block core, said another block core and said thin film core are integrally coupled together.

10. A perpendicular magnetic head according to claim 9, wherein said first and second support members have respective first and second top guide surfaces for guiding said magnetic surface of said magnetic recording medium, said guide surfaces and said pole face at the end of said thin film core being flush with one another.

11. A perpendicular magnetic head according to claim 9, wherein the turns number of said exciting coil per unit lenth increases toward the end of said block cores on the side of said magnetic tape.

12. A perpendicular magnetic head according to claim 9, wherein said exciting coil is wound through grooves formed in said first and second support members, the depth of said grooves increasing toward the aforesaid end of said block cores.

* * * * *